United States Patent [19]

Manning et al.

[11] Patent Number: 4,634,621
[45] Date of Patent: Jan. 6, 1987

[54] SCRIM REINFORCED, CLOTH-LIKE COMPOSITE LAMINATE AND A METHOD OF MAKING

[75] Inventors: James H. Manning; Cedric A. Dunkerly, II, both of Appleton, Wis.

[73] Assignee: The James River Corporation, Richmond, Va.

[21] Appl. No.: 611,145

[22] Filed: May 17, 1984

[51] Int. Cl.$^4$ .................................................. B32B 5/12
[52] U.S. Cl. ........................................ 428/110; 156/164; 156/306.6; 156/311; 156/324; 428/247; 428/249; 428/297; 428/298; 428/284; 428/326; 428/913
[58] Field of Search ............ 156/163, 164, 291, 306.6, 156/311, 324; 428/110, 111, 247, 248, 249, 297, 298, 326, 340, 198, 284, 913

[56] References Cited

U.S. PATENT DOCUMENTS

| | | | |
|---|---|---|---|
| 2,543,101 | 2/1951 | Francis, Jr. | 154/101 |
| 2,841,202 | 7/1958 | Hirschy | 154/101 |
| 2,902,395 | 9/1959 | Hirschy et al. | 154/46 |
| 3,341,394 | 9/1967 | Kinney | 161/72 |
| 3,485,706 | 12/1969 | Evans | 161/72 |
| 3,502,538 | 3/1970 | Petersen | 161/150 |
| 3,575,749 | 4/1971 | Kroyer | 154/1.7 |
| 3,629,048 | 12/1971 | Davison | 428/249 |
| 3,652,374 | 3/1972 | Condon | 156/174 |
| 3,692,622 | 9/1972 | Dunning | 161/124 |
| 3,708,383 | 1/1973 | Thomas et al. | 161/57 |
| 3,709,764 | 1/1973 | Thomas | 156/179 |
| 3,726,750 | 4/1973 | Stillings | 161/57 |
| 3,753,844 | 8/1973 | Braun | 161/57 |
| 3,755,028 | 8/1973 | Wood | 156/62.4 |
| 3,756,913 | 9/1973 | Wodka | 162/183 |
| 3,765,997 | 9/1973 | Dunning | 156/62.2 |
| 3,769,115 | 10/1973 | Rasmussen et al. | 156/622 |
| 3,770,562 | 11/1973 | Newman | 156/313 |
| 3,794,537 | 2/1974 | Rahmes | 156/62.8 |
| 3,809,604 | 5/1974 | Estes | 162/100 |
| 3,837,999 | 9/1974 | Chung | 162/101 |
| 3,885,279 | 5/1975 | Darnell et al. | 156/439 |
| 3,895,089 | 7/1975 | Goyal | 264/89 |
| 3,963,392 | 6/1976 | Goyal | 156/62.2 |
| 4,036,679 | 7/1977 | Back et al. | 162/111 |
| 4,049,491 | 9/1977 | Brandon et al. | 162/101 |
| 4,071,651 | 1/1978 | Hicklin et al. | 428/284 |
| 4,081,582 | 3/1978 | Butterworth et al. | 428/284 |
| 4,082,886 | 4/1978 | Butterworth et al. | 428/284 |
| 4,100,324 | 6/1978 | Anderson et al. | 428/288 |
| 4,152,479 | 5/1979 | Larsen | 428/224 |
| 4,154,883 | 5/1979 | Elias | 428/171 |
| 4,193,751 | 3/1980 | Miller | 425/83.1 |
| 4,196,245 | 4/1980 | Kitson et al. | 428/198 |
| 4,198,460 | 4/1980 | Kiss | 428/284 |
| 4,239,792 | 12/1980 | Ludwa | 428/198 |
| 4,264,290 | 4/1981 | Bunkerly, II | 264/121 |
| 4,284,680 | 8/1981 | Awano et al. | 428/234 |
| 4,285,647 | 8/1981 | Dunkerly, II | 425/82.1 |
| 4,292,271 | 9/1981 | Boub et al. | 264/518 |

Primary Examiner—James J. Bell
Attorney, Agent, or Firm—Finnegan, Henderson, Farabow, Garrett & Dunner

[57] ABSTRACT

A method of making a cloth-like composite laminate is provided. The method includes: inserting a scrim coated with a thermoplastic binder between two nonwoven layers, each of the nonwoven layers being formed of cellulosic fibers bound with a latex adhesive and heating the scrim and the two nonwoven layers to a temperature sufficient to activate the thermoplastic binder, the heating being performed without pressing the scrim and the nonwoven layers together so as to form a cloth-like composite laminate having a nonwoven layer of cellulosic fibers continuously bound to opposite sides of the scrim. The surface of each nonwoven layer is planar and uninterrupted by the scrim. The nonwoven layer is initially formed by forming two separate layers of three-dimensional cellulosic fibers, applying to each layer of three-dimensional cellulosic fibers a latex adhesive; and drying the latex adhesive to form two separate nonwoven layers of cellulosic fibers.

29 Claims, 3 Drawing Figures

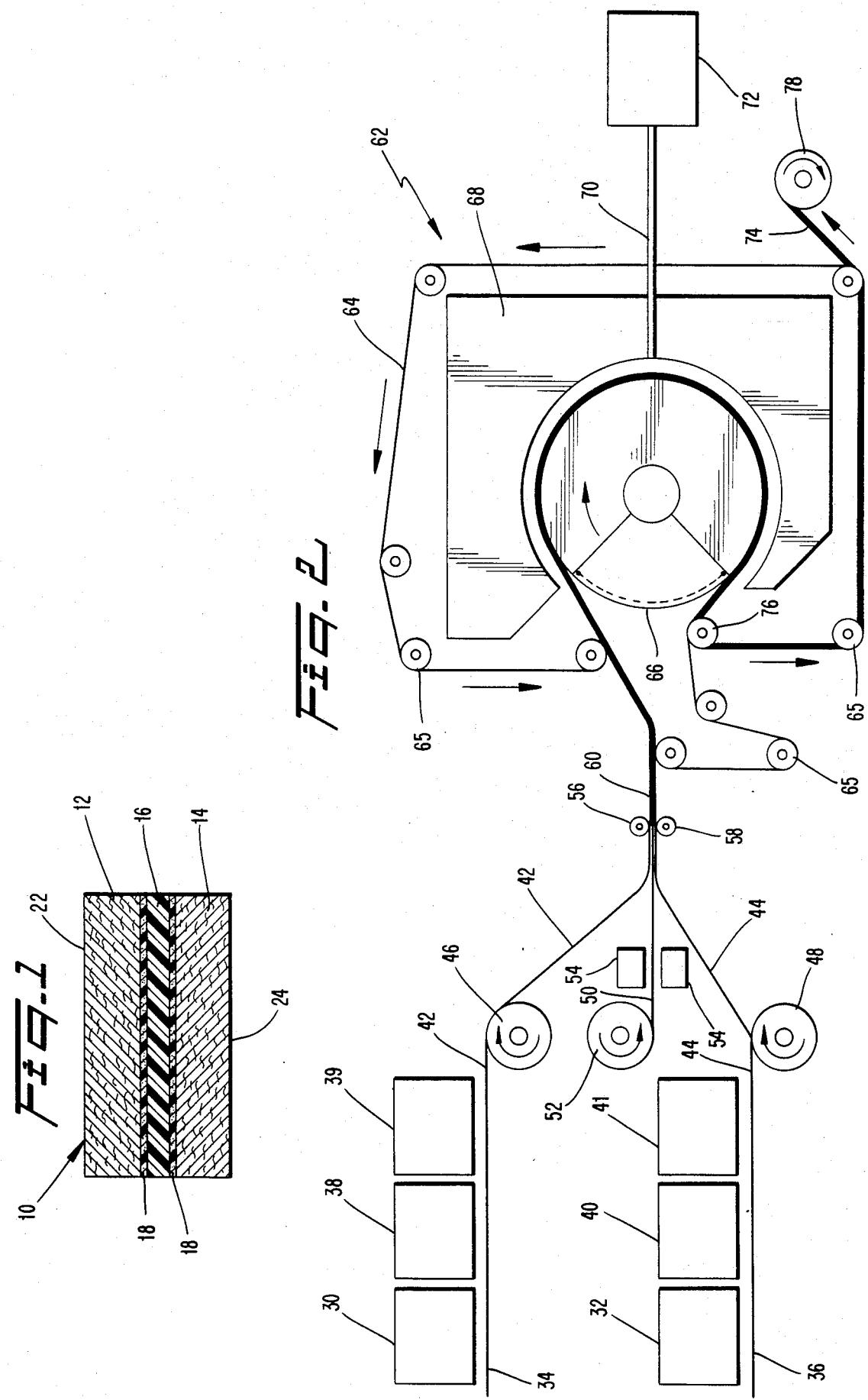

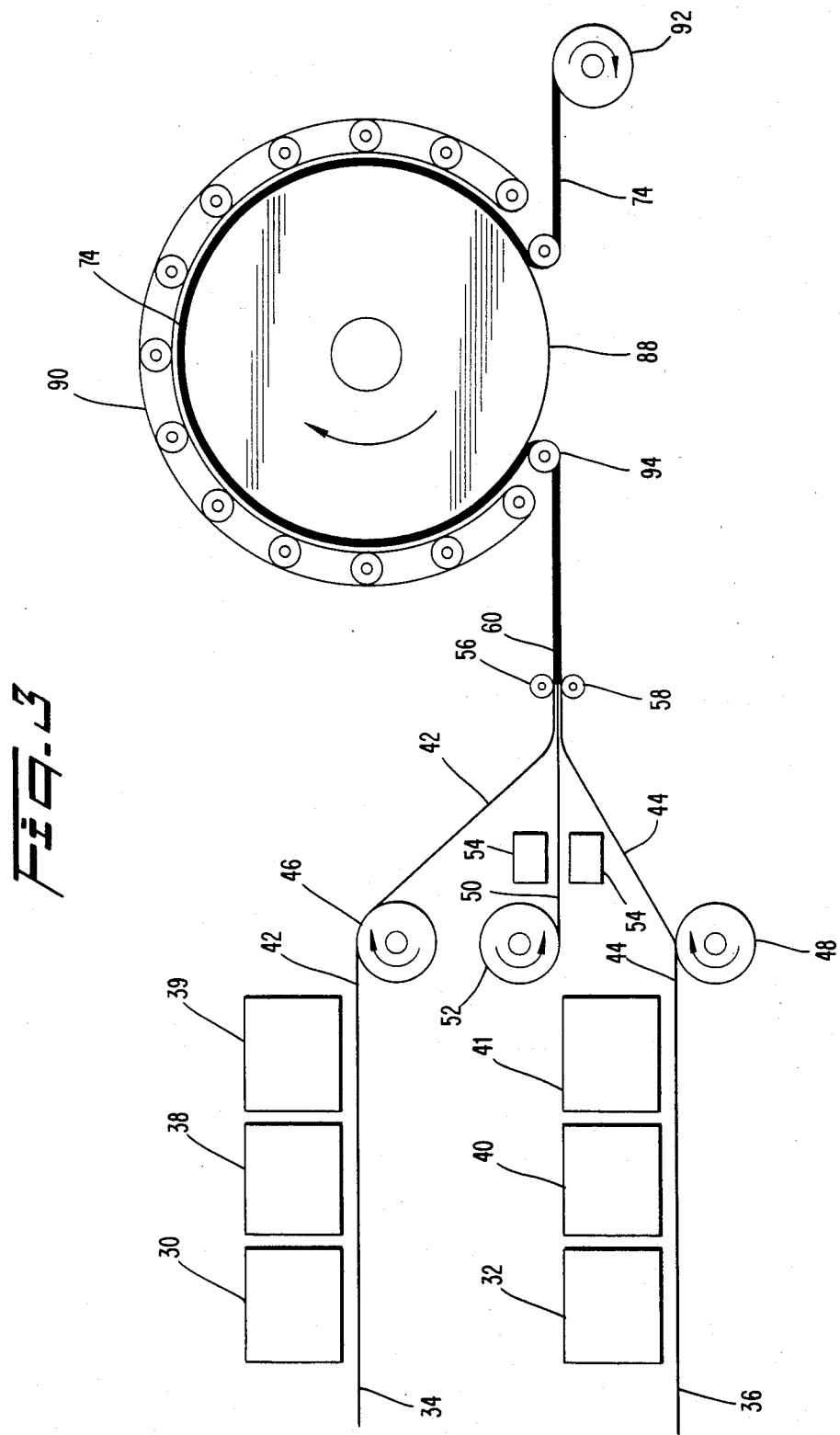

SCRIM REINFORCED, CLOTH-LIKE COMPOSITE LAMINATE AND A METHOD OF MAKING

FIELD OF THE INVENTION

The present invention relates to cloth like composite laminates and, more particularly, to scrim reinforced, cloth-like composite laminates including a layer of cellulosic fibers.

BACKGROUND OF THE INVENTION

It is usually desirable that cellulosic composite laminates exhibit a number of qualities, such as a cloth-like appearance, excellent wet and dry strength, exceptional porosity, very good abrasion resistance and wash durability, an exceptional bulk and water holding capacity, and a lack of a paper rattle. Cellulosic composite laminates that possess these qualities can be used to make towels or tissues that are valuable assets in the performance of a variety of tasks. For example, such a towel or tissue can be used by doctors and nurses as a highly effective and strong hand towel or tissue in both a hospital and an office.

Moreover, when a scrim is used as a reinforcing structure in the composite laminate, it is preferred that the scrim lines not be visible in the resulting composite laminate. The composite laminate should provide a planar surface that lacks demarcations due to the presence of scrim lines. Such a planar surface has a smooth textural feel, instead of a rough surface marred by scrim lines.

It is also desirable that the binder used in coating the scrim to bind the cellulosic fibers to the scrim does not significantly migrate into the cellulosic fiber layer. Such migration could adversely affect the properties of the cellulosic fibers.

Previous processes and cellulosic composite laminates fail to provide one or more of these desirable qualities. For example, in previous cellulosic composite layers having a scrim reinforcing layer, the scrim lines show through the surface of the laminate and the binder coating migrates into the cellulosic fibers. Similarly, the towels or tissues made from such laminates do not provide the requisite cloth-like appearance and bulk.

SUMMARY OF THE INVENTION

The present invention provides a cloth-like composite laminate with a superior balance of properties, such as strength, bulk, cloth-like appearance, abrasion resistance, wash durability, and porosity.

Another feature of the present invention is the provision of a cloth-like composite laminate in which the scrim reinforcing lines are not visible and the scrim coating does not migrate into the cellulosic fibers.

Additional advantages of the invention will be set forth in the description that follows, and in part will be obvious from the description, or may be learned by practice of the invention. The advantages of the invention are realized and obtained by the process and combinations particularly pointed out in the appended claims.

The present invention provides a method of making a cloth-like composite laminate comprising the steps of: inserting a scrim coated with a thermoplastic binder between two nonwoven layers, each of the nonwoven layers being formed of cellulosic fibers bound with a latex adhesive and heating the scrim and the two nonwoven layers to a temperature sufficient to activate the thermoplastic binder, the heating being performed without pressing the scrim and the nonwoven layers together so as to form a cloth-like composite laminate having a nonwoven layer of cellulosic fibers continuously bound to opposite sides of the scrim. The surface of each nonwoven layer is planar and uninterrupted by the scrim.

The present invention further provides a method of forming the nonwoven layers comprising the steps of forming two separate layers of three-dimensional cellulosic fibers; applying a latex adhesive to each layer of three-dimensional cellulosic fibers; and drying the latex adhesive to form two separate nonwoven layers of cellulosic fibers.

The present invention also provides a cloth-like composite laminate comprising: a scrim; two nonwoven layers of three-dimensional cellulosic fibers positioned on opposite sides of the scrim, the surface of each nonwoven layer being planar and uninterrupted by the scrim; a latex adhesive binding together the cellulosic fibers contained in each nonwoven layer; and a thermoplastic binder binding each nonwoven layer to the scrim.

The present invention overcomes the inherent disadvantages associated with previous scrim reinforced composite laminates and obtains the various advantages of the invention. The scrim lines do not show through the surface layer of the cellulosic composite laminate and the scrim coating remains localized near the scrim. Accordingly, the surface layer is planar and uninterrupted by the scrim lines, and the cellulosic fibers are not adversely affected by the migration of the thermoplastic binder.

The cellulosic composite laminates of the present invention also exhibit high wet and dry strength properties, and exceptional porosity. Towels or tissues made from the composite laminates appear cloth-like, and have excellent abrasion resistance and wash durability. The towels or tissues lack the noisy paper rattle that is commonly associated with most cellulosic products.

The foregoing and other features and advantages of the present invention will be made more apparent from the following description of the preferred embodiments.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a cross section through a cloth-like composite laminate of the present invention.

FIG. 2 is a schematic diagram illustrating the apparatus used in the method of the present invention.

FIG. 3 is a schematic diagram illustrating alternative apparatus used in the method of the present invention.

DESCRIPTION OF THE PREFERRED EMBODIMENT

Reference will now be made in detail to the present invention, embodiments of which are illustrated in the accompanying drawings.

The method of the present invention produces a cloth-like composite laminate. A scrim, coated with a thermoplastic binder, is initially inserted between two nonwoven layers. Each of the nonwoven layers is formed of cellulosic fibers bound with a latex adhesive. The scrim and the two nonwoven layers are heated to a temperature sufficient to activate the thermoplastic binder. The heating step is performed without pressing the scrim and the nonwoven layers together so as to form a cloth-like composite laminate having a nonwoven layer of cellulosic fibers continuously bound to opposite sides of the scrim. The surface of each nonwoven layer is planar and uninterrupted by the scrim.

The nonwoven layers can be initially made by forming two separate layers of three-dimensional cellulosic fibers. A latex adhesive is then applied to the three-dimensional cellulosic fibers in each layer. The latex adhesive is subsequently dried to form two separate nonwoven layers of cellulosic fibers.

The three-dimensional cellulosic fibers are preferably wood pulp fibers and most preferably twisted wood pulp fibers. Preferably, the wood pulp fibers are chemically treated and predried to obtain a 90 to 95% solids content. Examples of wood pulp fibers include cedar fibers, southern pine fibers, spruce fibers, and hemlock fibers. Suitable three-dimensional and twisted fibers are prepared by several methods, such as those described in U.S. Pat. Nos. 4,036,679 to Back, 3,809,604 to Estes, and 3,756,913 to Wodka. The particular fibers used depend upon the type of texture, such as soft, wooly, or fluffy, that is desired. Suitable dimensions for the fibers include lengths of from 0.5 millimeter to 5 millimeters, and thicknesses of from 1 micron to 6 microns.

The weight of the cellulosic fibers forming each nonwoven layer is within the range of 20 pounds/ream to 50 pounds/ream. The separate layers containing the cellulosic fibers can be formed by air laying or foam laying the cellulosic fibers onto various belts known in the art. One type of apparatus for air forming each layer of cellulosic fibers is shown in U.S. Pat. No. 4,193,751 to Miller. Other techniques known in the art can also be used such as foam forming as described in U.S. Pat. No. 3,837,999 to Chung or air emulsion as disclosed in U.S. Pat. No. 4,049,491 to Brandon et al.

The latex adhesive, used to bind together the three-dimensional cellulosic fibers in each nonwoven layer, can be selected from various latex adhesives known in the art. Acceptable latex adhesives include acrylate emulsions, butadiene-styrene emulsions, acetate-ethylene emulsions, and acrylonitrile-butadiene emulsions. An especially effective latex adhesive is acetate-ethylene, which is sold under the trademark AIRFLEX A-106 by Air Products, Inc. of Pennsylvania.

The skilled artisan can select the particular latex adhesive depending upon the type of cellulosic fibers that are to be bound. The latex adhesive is applied by known techniques such as spraying or foaming.

The amount of solids deposited from the latex adhesive used depends, inter alia, on the weight of the cellulosic fibers in each layer. Generally, latex adhesives having from 15 to 25% solids are used.

After the latex adhesive is applied to the cellulosic fibers, the latex adhesive is dried by conventional techniques. As a result, two separate nonwoven layers of cellulosic fibers are formed.

The scrim is preferably a continuous filament scrim composed of a nonwoven material, such as nylon, rayon, polyester, polypropylene, glass, and aramids such as Kevlar and Nomex which are trademarks of the E. I. DuPont de Nemours & Co. An example of a bonded polyester nonwoven material useful as a scrim is Bayex, which is a trademark of Bay Mills, Ltd. Such a scrim can have dimensions of 4 CD per inch, 150 denier by 12 MD per inch, 70 denier. The weight of the scrim is preferably within the range of 0.2 ounce per square yard to 2.0 ounces per square yard. Other scrims, such as a mesh scrim, can also be used in the present invention.

The preferred nonwoven material for the scrim has a set of spaced one-direction threads with a second set of spaced threads lying cross-directionally with respect to the first set of threads. The two sets of threads are bound or adhered together at the points the threads of one set cross the threads of another set. The threads making up the scrim can be in an over and under configuration, as shown in U.S. Pat. No. 3,885,279 to Darnell et al. or a one side pattern, as shown in U.S. Pat. No. 2,902,395 to Hirschy et al. Other scrim configurations known in the art, such as extended netting described in U.S. Pat. No. 4,152,479 to Larsen, can also be used.

The scrim is coated with a thermoplastic binder so that the two nonwoven layers of cellulosic fibers adhere to the sides of the scrim, when the scrim is inserted between the two nonwoven layers. Examples of acceptable thermoplastic polymer binders include polyvinyl chloride plastisol, polyvinylidene chloride, polyvinyl acetate, ethylene acrylic acid, and ethylene vinyl acetate. Other known thermoplastic binders can also be used. An especially effective polyvinyl chloride plastisol is sold under the trademark BAYEX F-50 by the Bay Mills, Ltd. of Canada.

The skilled artisan can select the particular thermoplastic polymer binder depending upon the type of cellulosic fibers and the scrim that are to be bound together. The scrim can be coated with the thermoplastic polymer binder by various known techniques.

After the scrim is inserted between the two nonwoven layers of cellulosic fibers, the scrim and the two nonwoven layers are heated to a temperature sufficient to activate the thermoplastic binder so as to laminate together the scrim and the nonwoven layers. The heating of the scrim and the nonwoven layers is performed without pressing the scrim and the nonwoven layers together.

The heating procedure is preferably performed by passing hot air through the two nonwoven layers and the scrim, in a manner shown in FIG. 2, or by passing the two nonwoven layers and the scrim over a large diameter, heated drum, as shown in FIG. 3. Other heating techniques, however, known in the art can also be used to bind the two separate nonwoven layers of cellulosic fibers onto opposite sides of the scrim.

After the lamination is completed, a cloth-like composite laminate 10, as shown in FIG. 1, is produced. The cloth-like composite laminate 10 has two separate nonwoven layers 12 and 14 of cellulosic fibers. The nonwoven layers 12 and 14 are continuously bound to opposite sides of the scrim 16. A thermoplastic polymer binder 18 coats each side of the scrim 16 to bind the two nonwoven layers 12 and 14 to the scrim 16. The scrim lines are not visible above the planar surfaces 22 and 24 of the nonwoven layers 12 and 14. Rather, the scrim lines lie within the cellulosic fibers of the nonwoven layers 12 and 14. The thermoplastic binder coating 18 on the scrim 16 does not migrate substantially into the nonwoven layers 12 and 14, since there is an absence of excessive pressure on the nonwoven layers and scrim during the lamination step.

The cloth-like composite laminates of the present invention exhibit high wet and dry strength properties, and exceptional porosity. Towels or tissues manufactured from these composite laminate appear cloth-like, and have excellent abrasion resistance and wash durability. The towels or tissue lack the noisy paper rattle that is commonly associated with most cellulosic paper products.

The method of the present invention can be performed by various apparatus known in the art. As illustrated in FIG. 2, two cellulosic fiber laying stations 30 and 32 deposit cellulosic fibers onto two belts 34 and 36. Subsequently, two application stations 38 and 40 apply a latex adhesive to the cellulosic fibers on each belt 34 and 36. The cellulosic fibers containing the latex adhesive are then passed through drying stations 39 and 41 to dry the latex and to form two separate nonwoven layers 42 and 44, which are collected respectively on supply rolls 46 and 48.

A scrim 50, such as a continuous filament scrim, is unwound from a supply roll 52 and it is either already precoated or coated with a thermoplastic polymer binder from a binder application station 54. The coated scrim 50 is then inserted between the two nonwoven layers 42 and 44 from supply rolls 46 and 48. The nonwoven layers 42 and 44 and the scrim 50, together forming the composite 60, are passed through a pair of rollers 56 and 58 into a lamination station 62.

In the lamination station 62, the composite 60 is guided by a restraining belt 64 and rollers 65 onto the circular carrying wires 66, which are positioned within a hood 68. Hot air 70, preferably at a temperature within the range of 220° to 410° F., is fed into the hood 68 from a hot air source 72 to activate the binder on the scrim. The hot air 70 is directed onto the composite 60 positioned on the circular carrying wires 66. The hot air causes the nonwoven layers and the scrim to laminate together to form the composite laminate 74. The restraining belts 64 are maintained very taut throughout the process.

While the composite 60 is on the restraining belt 64 and being heated by the hot air 70, the composite 60 is not pressed together. This absence of significant pressure on the composite layers during the heating step prevents both the scrim from interrupting the outer surfaces of the nonwoven layers and the migration of the thermoplastic binder away from the scrim into the nonwoven layers.

The formed composite laminate 74 exits from the hood 68 and passes over a cooling roll 76. The composite laminate is then taken up on a supply roll 78, for storage until later use.

Alternatively, as shown in FIG. 3, the circular carrying wires 66 and the hood 68 can be replaced by a drum 88 of relatively large diameter that is wrapped with a heated retaining belt 90. The retaining belt 90 wraps the heated drum 88, which is in contact with the composite 60 formed from the two nonwoven layers 42 and 44 and the scrim 50. A plurality of rollers 94 guide the composite through the drum 88 and retaining belt 90 arrangement. The hot drum 88 provides the requisite heat to the composite 60. The belt 90 also provides the requisite uniform pressure, such as 50 psi to 100 psi, to the composite 60 to form the laminate 74, which is taken up on roll 92. This pressure, however, is not sufficient to cause the substantial migration of the thermoplastic binder into the nonwoven layers.

Other embodiments of the invention will be apparent to one skilled in the art from a consideration of the specification or the practice of the invention disclosed herein. It is intended that the specification and examples be considered as exemplary only with the true scope and spirit of the invention being indicated by the claims.

What is claimed is:

1. A method of making a cloth-like composite laminate comprising the steps of:
   (a) inserting a scrim coated with a thermoplastic binder between two nonwoven layers each of the nonwoven layers being formed of cellulosic fibers bound with a latex adhesive; and
   (b) heating the scrim and the two nonwoven layers to a temperature sufficient to activate the thermoplastic binder, the heating being performed without pressing the scrim and the nonwoven layers together so as to form a cloth-like composite laminate having a nonwoven layer of cellulosic fibers continuously bound to opposite sides of the scrim, the surface of each nonwoven layer being planar and uninterrupted by the scrim.

2. The method of claim 1, wherein the three-dimensional cellulosic fibers are wood pulp fibers.

3. The method of claim 2, wherein the wood pulp fibers are selected from the group consisting of cedar fibers, southern pine fibers, spruce fibers and hemlock fibers.

4. The method of claim 2, wherein the wood pulp fibers are twisted.

5. The method of claim 1, wherein the weight of the three-dimensional cellulosic fibers forming each nonwoven layer is within the range of 20 pounds/ream to 50 pounds/ream.

6. The method of claim 1, wherein in the forming step the three-dimensional cellulosic fibers are foam laid.

7. The method of claim 1, wherein in the forming step the three-dimensional cellulosic fibers are air laid.

8. The method of claim 1, wherein the latex adhesive is selected from the group consisting of acrylate emulsions, butadiene-styrene emulsions, acetate-ethylene emulsions, and acrylonitrile-butadiene emulsions.

9. The method of claim 1, wherein the thermoplastic binder is selected from the group consisting of polyvinyl chloride plastisol, polyvinylidene chloride, polyvinyl acetate, ethylene acrylic acid, and ethylene vinyl acetate.

10. The method of claim 1, wherein the scrim is made of a continuous filament material.

11. The method of claim 1, wherein the scrim is made from a material selected from the group consisting of nylon, rayon, polyester, polypropylene, glass, and aramids.

12. The method of claim 1, wherein the weight of the scrim is within the range of 0.2 ounce per square yard to 2 ounces per square yard.

13. The method of claim 1, wherein the heating step is performed by passing heated air through the two nonwoven layers and the scrim.

14. The method of claim 1, wherein the heating step is performed by passing the two nonwoven layers and the scrim over a heated drum.

15. The method of claim 1, wherein the nonwoven layers are made by the steps of:
   (a) forming two separate layers of three-dimensional cellulosic fibers;
   (b) applying a latex adhesive to each layer of three-dimensional cellulosic fibers; and
   (c) drying the latex adhesive to form two separate nonwoven layers of cellulosic fibers.

16. The method of claim 1, wherein the thermoplastic binder remains localized near the scrim.

17. A method of making a cloth-like composite laminate comprising the steps of:
 (a) forming two separate layers of three-dimensional cellulosic fibers;
 (b) applying a latex adhesive to each layer of three-dimensional cellulosic fibers;
 (c) drying the latex adhesive to form two separate nonwoven layers of cellulosic fibers;
 (d) inserting a scrim coated with a thermoplastic binder between the two nonwoven layers of cellulosic fibers; and
 (e) heating the scrim and the two nonwoven layers to a temperature sufficient to activate the thermoplastic binder, the heating being performed without pressing the scrim and the nonwoven layers together so as to form a cloth-like composite laminate having a nonwoven layer of cellulosic fibers continuously bound to opposite sides of the scrim, the surface of each nonwoven layer being planar and uninterrupted by the scrim.

18. A cloth-like composite laminate comprising:
 (a) a scrim;
 (b) two nonwoven layers of three-dimensional cellulosic fibers positioned on opposite sides of the scrim, the surface of each nonwoven layer being planar and uninterrupted by the scrim;
 (c) a latex adhesive binding together the cellulosic fibers contained in each nonwoven layer; and
 (d) a thermoplastic binder binding each nonwoven layer to the scrim, the thermoplastic binder remaining localized near the scrim.

19. The cloth-like composite laminate of claim 18, wherein the three-dimensional cellulosic fibers are wood pulp fibers.

20. The cloth-like composite laminate of claim 19, wherein the wood pulp fibers are twisted.

21. The cloth-like composite laminate of claim 19, wherein the wood pulp fibers are selected from the group consisting of cedar fibers, southern pine fibers, spruce fibers, and hemlock fibers.

22. The cloth-like composite laminate of claim 18, wherein the weight of the three-dimensional cellulosic fibers forming each nonwoven layer is within the range of 20 pounds/ream to 50 pounds/ream.

23. The cloth-like composite laminate of claim 18, wherein the latex adhesive is selected from the group consisting of acrylate emulsions, butadiene-styrene emulsions, acetate-ethylene emulsions, and acrylonitrile-butadiene emulsions.

24. The cloth-like composite laminate of claim 18, wherein the thermoplastic binder is selected from the group consisting of polyvinyl chloride plastisol, polyvinylidene chloride, polyvinyl acetate, ethylene acrylic acid, and ethylene vinyl acetate.

25. The cloth-like composite laminate of claim 18, wherein the scrim is made of a continuous filament material.

26. The cloth-like composite laminate of claim 18, wherein the scrim is made from a material selected from the group consisting of nylon, rayon, polyester, polypropylene, glass and aramids.

27. The cloth-like composite laminate of claim 18, wherein the weight of the scrim is within the range of 0.2 ounce per square yard to 2 ounces per square yard.

28. The cloth-like composite laminate of claim 18, wherein the cellulosic fibers have lengths within the range of 0.5 millimeter to 5 millimeters.

29. The cloth-like composite laminate of claim 18, wherein the cellulosic fibers have a thickness in the range of 1 micron to 6 microns.

* * * * *